Figures 1, 2:
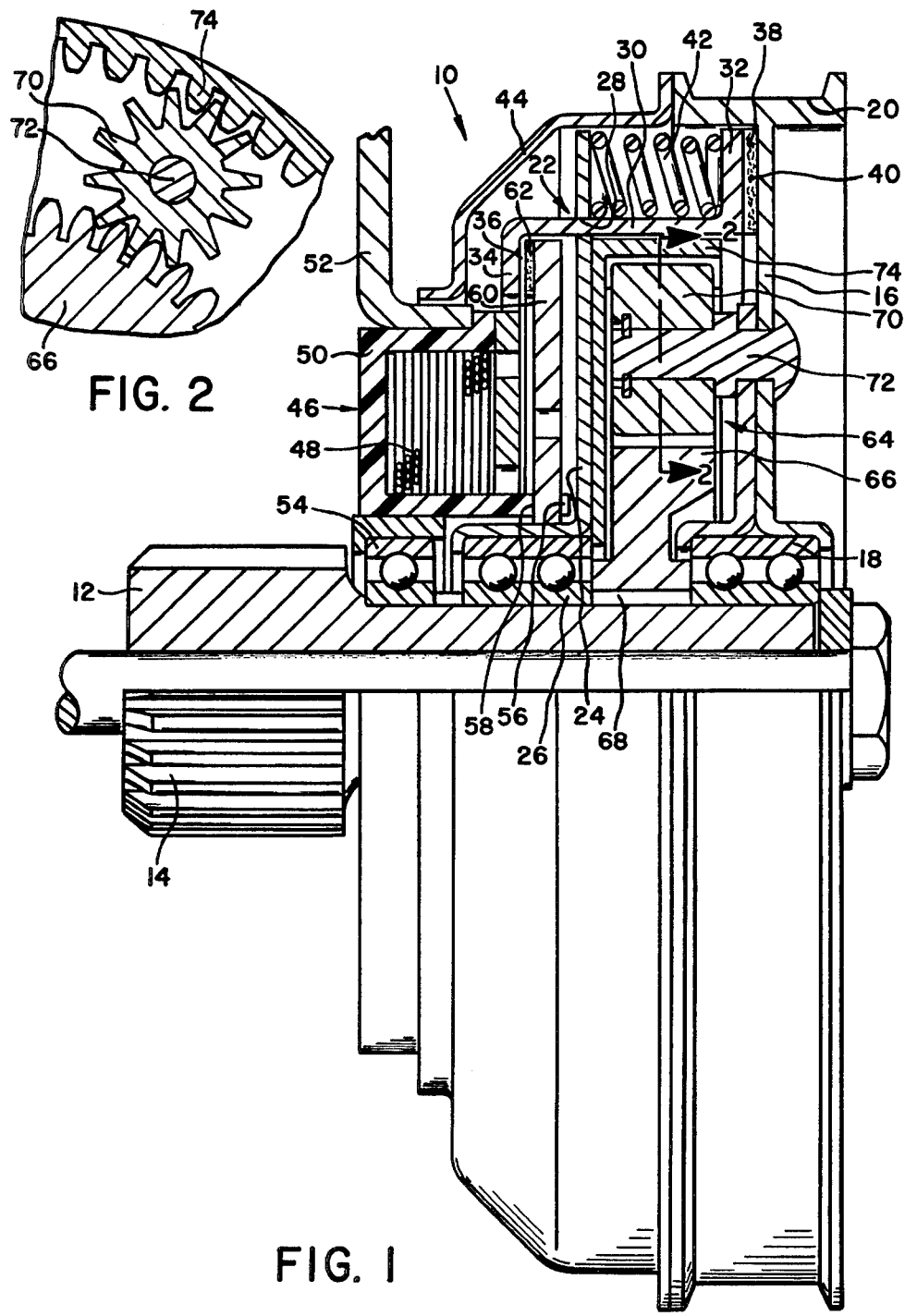

United States Patent [19]

Mason

[11] Patent Number: 4,484,495
[45] Date of Patent: Nov. 27, 1984

[54] DIFFERENTIAL DRIVE MECHANISM

[75] Inventor: Murray R. Mason, Kent Bridge, Canada

[73] Assignee: The Bendix Corporation, Southfield, Mich.

[21] Appl. No.: 370,447

[22] Filed: Apr. 22, 1982

[51] Int. Cl.³ .................. F16H 57/10; B60K 41/24; F16D 11/06
[52] U.S. Cl. .................. 74/785; 192/12 D; 192/18 B
[58] Field of Search ............. 74/785, 788; 192/18 B, 192/12 D

[56] References Cited

U.S. PATENT DOCUMENTS

| | | | |
|---|---|---|---|
| 2,500,447 | 3/1950 | Bitzer | 74/781 |
| 2,984,126 | 5/1961 | Feaster | 192/12 D X |
| 3,173,525 | 3/1965 | Hergert | 192/18 B X |
| 3,387,689 | 5/1968 | Ovshinsky | 192/18 B X |
| 3,396,610 | 8/1968 | Rich, Jr. et al. | 74/785 X |
| 3,473,639 | 10/1969 | Becker et al. | 192/18 B X |
| 3,589,485 | 6/1971 | Kajitani et al. | 192/12 D X |
| 3,600,616 | 8/1971 | Yokoyama | 192/18 B X |
| 3,752,010 | 8/1973 | Tipping | 74/785 X |

FOREIGN PATENT DOCUMENTS

| | | |
|---|---|---|
| 1585981 | 2/1970 | Fed. Rep. of Germany. |
| 2801812 | 7/1979 | Fed. Rep. of Germany. |
| 590050 | 6/1925 | France. |

OTHER PUBLICATIONS

Patent Abstracts of Japan vol. 5, No. 158, 12 Oct. 1981, JP-A-56-86260.

*Primary Examiner*—Lawrence J. Staab
*Assistant Examiner*—Bruce F. Wojciechowski
*Attorney, Agent, or Firm*—Markell Seitzman; Russel Wells

[57] ABSTRACT

A differential drive mechanism (10) includes a driving member (12) and a driven member (16). A planetary gearset (64) drivingly connects the driving member (12) and driven member (16) to drive the driven member (16) at a speed lower than that of the driven member (12) when the electromagnetic actuator (46) is energized. When the electromagnetic actuator (46) is not energized, a clutching member (22) engages the driven member (16) to cause the latter to be driven at the same speed as that of the driving member (12).

11 Claims, 2 Drawing Figures

DIFFERENTIAL DRIVE MECHANISM

This invention relates to a differential drive mechanism.

Automotive vehicles normally use a number of belt-driven engine accessories, such as a power steering pump, an alternator, an air conditioning compressor, etc. These accessories are commonly driven at a single drive ratio regardless of engine speed. Accordingly, these accessories are driven much faster than necessary during highway cruise conditions in order that they be driven fast enough at engine idle conditions. Furthermore, the parasitic drag inherent in these belt-driven engine accessories is detrimental to acceleration performance. While the effect of the belt-driven engine accessories on vehicle acceleration is not critical in vehicles provided with relatively large engines, the drag of the engine accessories can become a significant factor on the smaller four cylinder engines now commonly used in automotive vehicles. Accordingly, the present invention provides increased fuel economy and increased acceleration performance by providing a differential drive mechanism that operates the engine belt-driven accessories at a higher drive ratio during engine idle and low speed operation, and at a lower drive ratio during highway cruise conditions and when the vehicle is accelerated.

While the invention has been disclosed with respect to a vehicle engine accessory drive, it may be used wherever a selectively actuable, two-speed drive is necessary, either on automotive vehicles or elsewhere, such as industrial machines. The scope of the invention is to be limited only by the scope of the appended claims.

Other features and advantages of the invention will appear in the following description with reference to the accompanying drawings in which:

FIG. 1 is a longitudinal cross-section of a differential drive mechanism made pursuant to the teachings of my present invention; and FIG. 2 is a fragmentary transverse cross-sectional view of the differential drive mechanism illustrated in FIG. 1 taken substantially along lines 2—2.

Referring now to the drawings, a differential drive mechanism is generally indicated by the numeral 10 and includes an input shaft or driving member 12 that is driven by the vehicle engine through the keyway connection 14. A driven or output member 16 is rotatably mounted on the shaft 12 through bearings 18. Output member 16 is further provided with a pulley face 20 to drive the engine accessories.

Drive mechanism 10 further includes a clutching member generally indicated by the numeral 22. Clutching member 22 includes a support 24 which is rotatably mounted on the driving member 12 by bearings 26. The support 24 is provided with circumferentially spaced apertures 28 that receive supports 30 which mount a pressure plate 32. The supports 30 terminate in a radially inwardly projecting, circumferentially extending surface 34 which carries a radially inwardly projecting, circumferentially extending engagement face 36. The pressure plate 32 carries a circumferentially extending band of friction material 38 which is adapted to engage an engagement surface 40 on the driven member 16. A spring 42 yieldably urges the pressure plate 32 towards the driven member 16, thereby yieldably urging the friction material 38 into engagement with the engagement surface 40. A shroud 44 rotates with the driven member 16 and protects the clutching strcture 22.

An electromagnetic actuator generally indicated by the numeral 46 includes a coil 48 which is wrapped circumferentially around the driving member 12 and is connected to appropriate engine speed and/or acceleration sensors (not shown) that are adapted to energize the coil 48 during engine acceleration and/or highway cruise conditions. The coil 48 is enclosed within a housing 50 which is supported on a non-rotatable portion of the vehicle by a support 52. The housing 50 is further supported by the driven member 12 through the bearing 54. The housing 50 includes a projecting portion 56 that is slidably received in an aperture 58 defined within an armature 60. Because of the sliding engagement of the armature 60 on the projecting portion 56, the armature 60 is able to slide toward and away from the coil 48, but is restrained against rotation relative thereto. The armature 60 also acts as a clutching structure, and is provided with friction material 62 which is adapted to engage the engagement face 36 when the armature is moved toward the coil 48. As will be readily recognized by those skilled in the art, energization of the coil 48 causes the armature 60 to move toward the coil.

A planetary gear set generally indicated by the numeral 64 includes a sun gear 66 which is mounted for rotation with the driving member 12 by way of key-way or connection 68, a planet gear 70 which is mounted for rotation on a spindle 72 which is secured to the driven member 16, and a ring gear 74 which is secured to the support 24 of the clutching member 22 and is rotatable therewith. The planet gear 70, as is most clearly shown in FIG. 2, engages both the sun gear 66 and the ring gear 74, and is rotatable both with and relative to the driven member 16.

In operation, assuming that the coil 48 is deenergized, the spring 42 yieldably urges the pressure plate 32 towards the driven member 16, thereby engaging the friction material 38 with the engagement surface 40 to thereby couple the clutching member 22 for rotation with the driven member 16. Accordingly, rotation of the driving member 12 will be transmitted to the driven member 16 through the sun gear 66, the planet gear 70 and the ring gear 74 to the clutching member 22 and from the clutching member 22 to the driven member 16 through the engagement surface 40. Since the ring gear 74 is integral with the clutching member 22, and since the clutching member 22 is engaged for rotation with the driven member 16, rotary motion of the sun gear 66 will be transmitted to the driven member 16. Accordingly, the sun gear 66 and the planet gear 70 do not rotate relative to one another and act as a link to transmit motion from the driving member 12 to the ring gear 74.

When the aforementioned sensors sense an operating condition such that the beltdriven accessories should be operated at the slower speed, the aforementioned sensors energize the coil 48, causing the armature 60 to be moved toward the coil. As the armature 60 moves, the friction material 62 carried by the armature engages the engagement face 36 of the inwardly projecting portion 34 of the support 30, thereby also forcing the pressure plate 32, and therefore the friction material 38, away from the engagement surface 40 on the driven member 16. Accordingly, the coupling engagement between the clutching member 22 and the driven member 16 is broken. Since the armature 60 is held against rotation by engagement of the projections 56 and the aperture 58, engagement of the friction material 62 with the engagement face 36 prevents rotation of the clutching member 22. Accordingly, since the ring gear 74 is integral with the clutching member 22 and is likewise prevented from rotating, the planet gear 70 now rotates with respect to the ring gear 74. Since the planet gear 70 is rotatable with the driven member 16 and is also rotatable relative to the driven member 16 about the spindle 72, the driven member 16 will now rotate at some predetermined rato to the speed of rotation of the driving member 12, which ratio is dependent upon the ratio between the planet gear 70 and the sun gear 66. Upon the de-energization of the coil 48, the spring 42 will again urge the pressure plate, and therefore the friction material 38, into engagement with the surface 40, to thereby permit the driving member 12 to rotate the driven member 16 at the same speed as the driving member 12.

I claim:

1. A differential drive mechanism comprising:

a rotatable driving member;

a rotatable driven member rotationally supported relative to said driving member; said driven member defining an engagement surface rotatable therewith; said driven member supporting a plurality of planetary gears for rotation thereabout;

a sun gear rotationally mounted with said driving member for drivingly engaging said planetary gears;

a ring gear rotationally isolated relative to said driving member and coaxially positioned in meshing engagement relative to said planetary gear;

clutch means including a first support mounted to and rotatable with said ring gear, said first support including a plurality of spaced apertures, said clutch means further including axially extending support means movably extending through said apertures, said support means defining a movable pressure plate positioned in mating engagement with said first engagement surface, said pressure plate engaging said first engagement surface; said support means further including a circumferentially extending portion which defines a radially inwardly projecting, circumferentially extending second engagement surface, spring means positioned between said first support and said support means for biasing said pressure plate towards said first engagement surface;

said clutch means further including:

an electromagnetic actuator including a coil fixed relative to the rotation of said driving member, axially movable armature means positioned between said second engagement surface and said first support and carrying therewith friction material for engagement with said second engagement surface, for moving said support means axially to move said pressure plate out of engagement with said first engagement surface and for rotationally fixing said support means, said first support and said ring gear in response to electromagnetic forces generated by said coil, said armature including an aperture and said electromagnetic actuator further including means slidably engaging said aperture for rotationally restraining said armature.

2. The differential drive mechanism as defined in claim 1, wherein said first support comprises a flat disk having a perimeter portion radially extending beyond said ring gear.

3. The differential drive mechanism as defined in claim 1, wherein said apertures are positioned within said perimeter portion.

4. The differential drive mechanism as defined in claim 1 wherein said driven member supports a pulley.

5. The differential drive as defined in claim 4 wherein said restraining means includes a member projecting axially from said coil into and through said armature aperture.

6. The differential drive as defined in claim 5 further including a cover mounted to and rotatable with said driven element, extending axially therefrom for covering said clutch means.

7. A differential drive mechanism comprising:

a rotatable driving member;

a rotatable driving member supported on bearings relative to said driving member; said driven member defining a first engagement surface rotatable therewith; said driven member supporting a plurality of planetary gears for rotation thereabout;

a sun gear mounted about said driving member for rotation therewith and for drivingly engaging said planetary gears;

a ring gear rotationally mounted relative to said driving member and coaxially positioned in meshing engagement relative to said planetary gears;

clutch means including a first support mounted to and rotatable with said ring gear, said first support including a plurality of spaced apertures, said clutch means further including axially extending support means movably extending through said apertures, said support means defining a movable pressure plate positioned in mating engagement with said first engagement surface, said pressure plate comprising a flange which extends radially outward from said support means, said flange supporting a band of friction material for engagement with said first engagement surface; said support means further including a circumferentially extending portion which defines a radially inwardly projecting circumferentially extending second engagement surface, spring means positioned between said first support and said support means for biasing said pressure plate towards said first engagement surface, said clutch means further including:

an electromagnetic actuator including a coil fixed relative to the rotation of said driving member, an axially movable armature positioned between said second engagement surface and first support and and carrying therewith friction material for engagement therewith and for rotationally fixing said support means, said first support and said ring gear in response to electromagnetic forces generated by said coil, said armature including an aperture and said electromagnetic actuator further including means slidably engaging said aperture for rotationally restraining said armature.

8. The differential drive mechanism as defined in claim 7, wherein said first support comprises a flat disk having a perimeter portion radially extending beyond said ring gear.

9. The differential drive mechanism as defined in claim 8 wherein said apertures are positioned within said perimeter portion.

10. The differential drive mechanism as defined in claim 9 wherein said driven member supports a pulley.

11. The differential drive defined in claim 10 wherein said restraining means includes a member projecting axially from said coil into and through said armature aperture.

* * * * *